United States Patent
Asai (10) Patent No.: US 8,063,518 B2
(45) Date of Patent: Nov. 22, 2011

(54) MOTOR STATOR AND STATOR MANUFACTURING METHOD

(75) Inventor: Masataka Asai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/513,766

(22) PCT Filed: Oct. 30, 2007

(86) PCT No.: PCT/JP2007/071463
§ 371 (c)(1),
(2), (4) Date: May 6, 2009

(87) PCT Pub. No.: WO2008/075506
PCT Pub. Date: Jun. 26, 2008

(65) Prior Publication Data
US 2009/0302694 A1    Dec. 10, 2009

(30) Foreign Application Priority Data

Dec. 21, 2006  (JP) .................. 2006-344729

(51) Int. Cl.
*H02K 15/12* (2006.01)
*H02K 3/34* (2006.01)
(52) U.S. Cl. .......................... 310/43; 310/208
(58) Field of Classification Search ............ 310/43, 310/45, 208, 254.1, 216.008, 216.009, 216.084, 310/216.135; 428/339, 323, 327, 332
See application file for complete search history.

(56) References Cited

U.S. PATENT DOCUMENTS

| | | | |
|---|---|---|---|
| 4,365,407 A | 12/1982 | Zdaniewski et al. | |
| 5,057,731 A * | 10/1991 | Hancock | 310/180 |
| 5,714,824 A * | 2/1998 | Couture et al. | 310/208 |
| 5,729,072 A * | 3/1998 | Hirano et al. | 310/216.009 |
| 5,986,375 A * | 11/1999 | Umeda et al. | 310/180 |
| 5,986,377 A * | 11/1999 | Yamada et al. | 310/216.013 |
| 6,043,583 A * | 3/2000 | Kurosawa et al. | 310/254.1 |
| 6,049,153 A * | 4/2000 | Nishiyama et al. | 310/216.009 |
| 6,075,304 A * | 6/2000 | Nakatsuka | 310/216.137 |
| 6,081,059 A * | 6/2000 | Hsu | 310/179 |
| 6,137,201 A * | 10/2000 | Umeda et al. | 310/179 |
| 6,167,610 B1 * | 1/2001 | Nakahara et al. | 29/596 |
| 6,658,721 B2 * | 12/2003 | Kazama et al. | 29/596 |
| 7,067,952 B2 * | 6/2006 | Neal | 310/254.1 |
| 7,146,706 B2 * | 12/2006 | Du et al. | 29/596 |

(Continued)

FOREIGN PATENT DOCUMENTS

CN    164307 A    7/2005

(Continued)

OTHER PUBLICATIONS

Office Action issued Jun. 29, 2011 in corresponding German Patent Application and English translation thereof.

*Primary Examiner* — Tran Nguyen
(74) *Attorney, Agent, or Firm* — Kenyon & Kenyon LLP (57) ABSTRACT

A motor stator includes a plurality of stator cores constituted of divided cores and cassette coils which are conductive coils. One of the divided core and the cassette coil is integrally formed with an insulator of a thermosetting resin by insert molding. A stator assembly including the plurality of cassette coils is covered with a thermosetting resin by molding to produce the state.

12 Claims, 10 Drawing Sheets

U.S. PATENT DOCUMENTS

| | | | |
|---|---|---|---|
| 7,576,467 B2 * | 8/2009 | Yamamoto et al. | 310/216.009 |
| 2004/0034988 A1 | 2/2004 | Neal | |
| 2005/0107497 A1 * | 5/2005 | Akaho et al. | 523/457 |

FOREIGN PATENT DOCUMENTS

| | | | |
|---|---|---|---|
| CN | 1643071 A | 7/2005 | |
| EP | 1 473 329 A | 11/2004 | |
| JP | 57 139914 A | 8/1982 | |
| JP | 57 183235 A | 11/1982 | |
| JP | 58 170332 A | 10/1983 | |
| JP | 60-055846 A | 4/1985 | |
| JP | 63 018936 A | 1/1988 | |
| JP | 09-172748 A | 6/1997 | |
| JP | 2001-128402 A | 5/2001 | |
| JP | 2001-226573 A | 8/2001 | |
| JP | 2002-191149 A | 7/2002 | |
| JP | 2002-191155 A | 7/2002 | |
| JP | 2003-259591 A | 9/2003 | |
| JP | 2003-284277 A | 10/2003 | |
| JP | 2004-229429 A | 8/2004 | |
| JP | 2004-292533 A | 10/2004 | |
| JP | 3659874 | 3/2005 | |
| JP | 2006-034042 A | 2/2006 | |

* cited by examiner

*PRIOR ART*

MOTOR STATOR AND STATOR MANUFACTURING METHOD

This is a 371 national phase application of PCT/JP2007/071463 filed 30 Oct. 2007, claiming priority to Japanese Patent Application No. 2006-344729 filed 21 Dec. 2006, the contents of which are incorporated herein by reference.

TECHNICAL FIELD

The present invention relates to a motor stator having a stator coil including a stator core, a conductive coil, and an insulator between the stator core and the conductive coil, and a manufacturing method thereof.

BACKGROUND ART

A conventional motor stator includes a plurality of stator coils each of which is comprised of a conductive coil wound around a stator core. A resin insulator is interposed between the stator core and the conductive coil to ensure insulation therebetween. After the conductive coil is inserted on the stator core through the insulator, they are entirely covered with a molding material by molding to form a stator. The molding is performed to allow the heat generated in the conductive coil to radiate to the outside and also to prevent water or the like from entering the stator.

A manufacturing method of the stator is conducted by mounting the conductive coil fitted on the insulator onto the stator core, attaching a bus bar and others, and molding them entirely.

Here, a clearance between the insulator and the conductive coil is set to be small in order to enhance heat conduction. Therefore, during the molding for the conductive coil fitted on the insulator, the molding material could not sufficiently enter the clearance, thus leaving an air layer between the insulator and the conductive coil. Such air layer is likely to decrease the heat conduction due to poor heat conductivity of the air layer, resulting in insufficient heat radiation of the motor.

To avoid the above problems, one measure is to cover the insulator and the conductive coil by molding prior to the entirely molding.

For example, JP3659874 discloses a technique of covering a flat wire with no insulation inserted in a slot insulator with an epoxy thermosetting resin by molding and, after assembling components forming a stator, entirely covering the assembly again with an epoxy thermosetting resin by molding. More specifically, the flat wire corresponding to the conductive coil is inserted in the slot insulator corresponding to the insulator, and the combined unit is installed in a slot and then covered once with the epoxy thermosetting resin. After the components forming the stator are assembled together, the epoxy thermosetting resin is molded around the assembly to complete the stator.

As the molding material, on the other hand, a thermosetting resin containing a large amount of filler is used in order to enhance crack resistance and heat conduction.

As a material of the insulator, a thermoplastic resin is used in order to enhance productivity. In the case of using the thermoplastic resin containing a large amount of filler to reduce linear expansion coefficient to the level of a coil or a stator core and enhance heat conduction, it is likely that its fluidity decreases and also tenacity decreases, leading to occurrence of cracks in the insulator itself.

DISCLOSURE OF INVENTION

Problems to be Solved by the Invention

However, the stator and the stator manufacturing method disclosed in JP3659874 have the following disadvantages.

Figure 12:
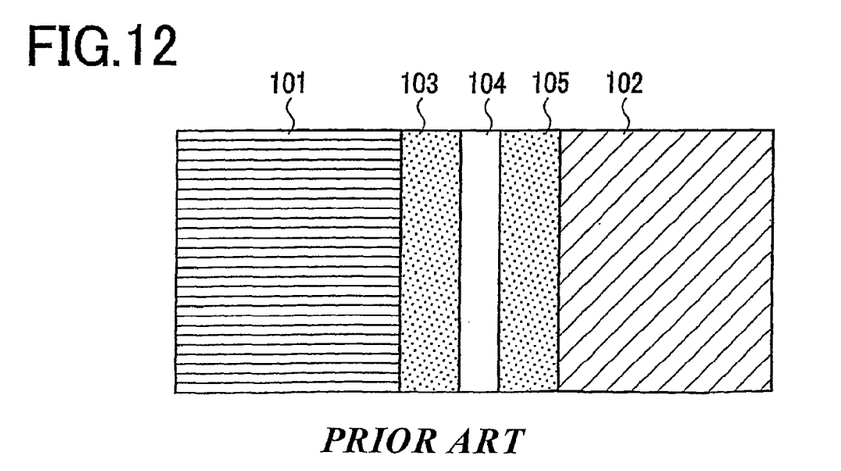
FIG. 12 is a view showing a layer configuration in a prior art.

The molding material that has entered and filled in the clearance between the insulator and the conductive coil could reduce the possibility that an air layer is left in the clearance. However, as shown in FIG. 12, three layers are formed between the conductive coil 102 and the stator core 101; specifically, those layers are an epoxy resin molding layer 105 formed by permeating into the clearance between an insulator 104 and the conductive coil 102 in a first molding process; the insulator 104; and another epoxy resin molding layer 103 formed in an entirely molding process. Accordingly, four boundary surfaces exist between five layers. There is generally known that the heat conductivity on a boundary surface is lower than in a layer. The heat conductivity is apt to change from layer to layer and thus a stable heat transfer condition could not be realized. It is therefore difficult to further increase the heat conduction.

Further, the occurrence of cracks often results from peeling or separation of layer(s) at each boundary surface. Accordingly, the crack resistance decreases as the number of boundary surfaces is larger.

Recently, concerning hybrid electric vehicles, a compact motor that allows a high pressure current to flow therethrough to output high torque has been under development. Accordingly, a stator having higher heat conduction and high crack resistance has been demanded to prevent the motor from rising in temperature; however, such motor is hard to realize.

The present invention has been made in view of the above circumstances and has an object to provide a stator having high heat conduction and high crack resistance.

Means for Solving the Problems

To achieve the above object, a motor stator and a stator manufacturing method of the present invention have the following configurations.

(1) According to one aspect of the present invention, there is provided a motor stator including a plurality of stator coils each of which is formed of a conductive coil wound on a stator core, wherein one of the stator core and the conductive coil is integrally formed with an insulator made of a thermosetting resin by insert molding, and the stator including the plurality of stator coils is covered with a thermosetting resin by molding.

(2) In the motor stator (1), the thermosetting resin forming the insulator and the thermosetting resin covering the stator including the plurality of stator coils by the molding are equal in linear expansion coefficient.

(3) In the motor stator (2), the resins equal in linear expansion coefficient are an epoxy thermosetting resin containing 60 to 80 vol % of filler, and the linear expansion coefficient is 10 to 20 ppm/° C.

(4) In the motor stator (1) according to claim 1, the thermosetting resin forming the insulator is larger in heat conductivity than the thermosetting resin covering the stator by the molding.

(5) In the motor stator (1), the conductive coil is a coil which has a flat shape in section and is wound edgewise, and the insulator is partly formed at four corners of one of the stator core and the conductive coil.

(6) According to another aspect, the present invention provides a motor stator manufacturing method for manufacturing a motor stator including a plurality of coils each of which is formed of a conductive coil wound on a stator core, comprising the steps of: forming an insulator of a thermosetting resin in such a manner as to be integral with one of the stator core and the conductive coil by insert molding; and covering the stator including the plurality of coils with a thermosetting resin by molding.

Operations and advantages of the stator and the stator manufacturing method having the above configurations are described below.

When the stator core is covered with thermosetting resin by insert molding, the stator core is preferably comprised of a plurality of divided cores to facilitate the insert molding. A cavity of a mold is designed with a shape corresponding to the divided core with the insulator. In the cavity, the divided core is inserted and for example an epoxy thermosetting resin is injected around the divided core. Thus, the epoxy thermosetting resin is molded under pressure on the surface of the divided core. Since the insert molding is performed by injecting the epoxy thermosetting resin under pressure, the insulator and the divided core can be formed integrally so that the epoxy thermosetting resin is in close contact with the surface of the divided core. Accordingly, the number of boundary surfaces is reduced by one, preventing a decrease in heat conduction and a decrease in crack resistance due to the boundary surfaces. Furthermore, the epoxy thermosetting resin has an adhesive function and thus can achieve a higher heat conduction of the stator.

Similarly, when the cassette coil is to be formed by winding the conductive coil and attached on the stator core, the insulator is formed by insert molding on the inner surface of the cassette coil which will contact with the stator core. More specifically, a cavity of a mold is designed with a shape corresponding to the cassette coil with the insulator. In the cavity, the cassette coil is inserted and for example an epoxy thermosetting resin is injected around the cassette coil. Thus, the epoxy thermosetting resin is molded under pressure on the surface of the cassette coil. By the insert molding, the epoxy thermosetting resin can be molded in close contact with the inner surface of the cassette coil, forming the insulator integral with the cassette coil. No clearance is therefore formed between the insulator and the cassette coil. During the molding of the entire assembly, therefore, it is possible to prevent the molding material from entering between the cassette coil and the insulator. The number of boundary surfaces can be reduced by one, thereby preventing a decrease in heat conduction and a decrease in crack resistance due to layer changes, namely, the boundary surfaces. Furthermore, the epoxy thermosetting resin has an adhesive function and thus can exhibit higher heat conduction.

The thermosetting resin used as a material forming the insulator and the thermosetting resin used in the entire molding are resins with the same linear expansion coefficient. Accordingly, as the temperature of the motor rises, the insulator and the entirely molded layer will expand and contract together at the same expansion coefficient at the boundary surfaces. It is therefore possible to restrain peeling or separation at the boundary surfaces, thus enhancing the crack resistance.

Since the heat conductivity of the thermosetting resin used as the material forming the insulator is set to be larger than the heat conductivity of the thermosetting resin used as the material forming the molded layer, the heat radiation capability of the insulator can be increased. In other words, the divided core and the insulator are integrally bonded to each other in close contact relation, exhibiting high heat conduction. Therefore, the heat generated in the cassette coil can be transferred to the divided core more effectively.

To increase the heat conduction, on the other hand, the heat conductivity of a matrix and the heat conductivity of the filler have to be increased. However, both measures are high in cost, leading to an increase in total cost of the stator. The molded layer is formed thicker at a coil end by a large amount of the material, while the insulator is of a thickness of several hundred microns by a very little amount of the material. Thus, the heat conduction of the insulator can be set to be larger without causing cost increase.

BEST MODE FOR CARRYING OUT THE INVENTION

Figure 1A:
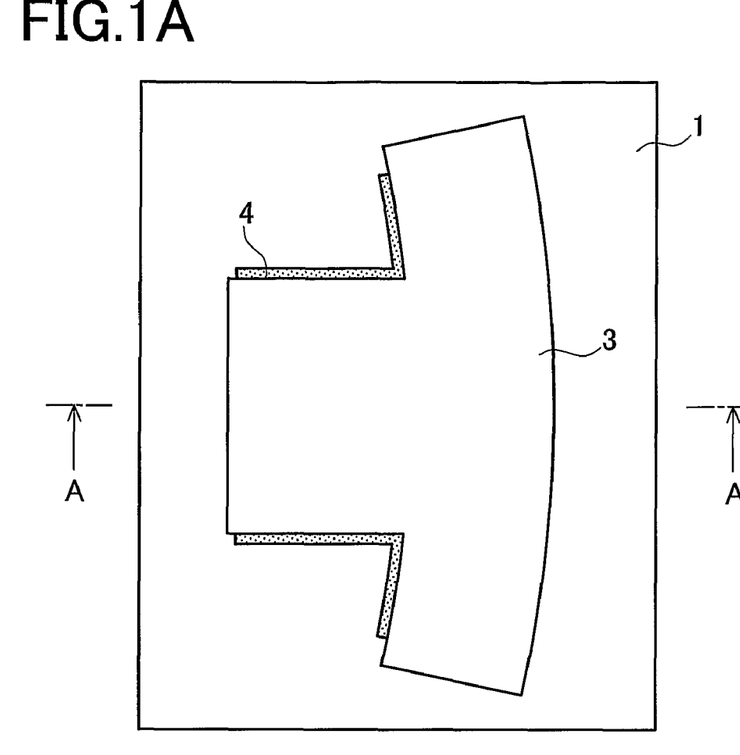
FIGS. 1A and 1B are views of a mold for forming an insulator on a divided core by insert molding in a first embodiment.
Figure 1B:
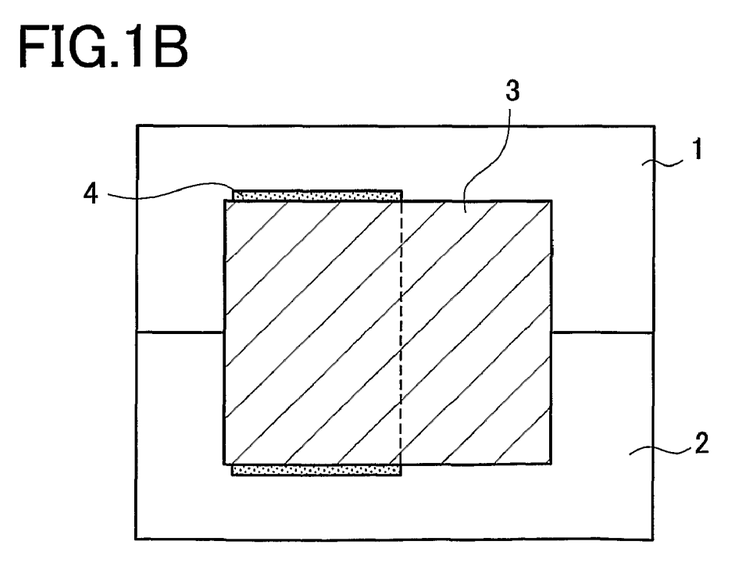

A detailed description of a preferred embodiment of a stator and a stator manufacturing method embodying the present invention will now be given referring to the accompanying drawings. Firstly, the case where an insulator 4 is formed on a divided core 3 by insert molding in a first embodiment will be described below. FIG. 1A is a sectional plan view of a mold used in the insert molding. FIG. 1B shows a sectional view of the mold taken along a line A-A in FIG. 1A. These figures show sectional views without hatching for convenience.

The mold includes an upper mold 1 and a lower mold 2 which are mated together to form a cavity. This cavity is a space defining the shape of a combination of the divided core 3 and the insulator 4. In this cavity, the divided core 3 is inserted and then for example an epoxy thermosetting resin is injected. Thus, the epoxy thermosetting resin is molded under pressure as the insulator 4 on the surface of the divided core 3. By the insert molding, the epoxy thermosetting resin can be formed as the insulator 4 on the surface of the divided core 3 in such a manner as to be integral with the divided core 3. In particular, the epoxy thermosetting resin has a high adhesive property and therefore the insulator 4 can be formed in close contact with the surface of the divided core 3. Thus, no clearance is created between the insulator 4 and the surface of the divided core 3.

Resin to be used for forming the insulator 4 is an epoxy thermosetting resin that contains filler. The filler may be selected from among high heat-conductive filler such as aluminum and silica, low linear-expansion filler such as fused silica, reinforced filler such as milled fiber, a stress reducing agent such as elastomer components. A filling rate of the filler is 60 vol % to 80 vol %. The linear expansion coefficient of the resin is adjusted in a range of 10 to 20 ppm/° C. so as to approach the linear expansion coefficient of the coil and the stator core.

Figure 2A:
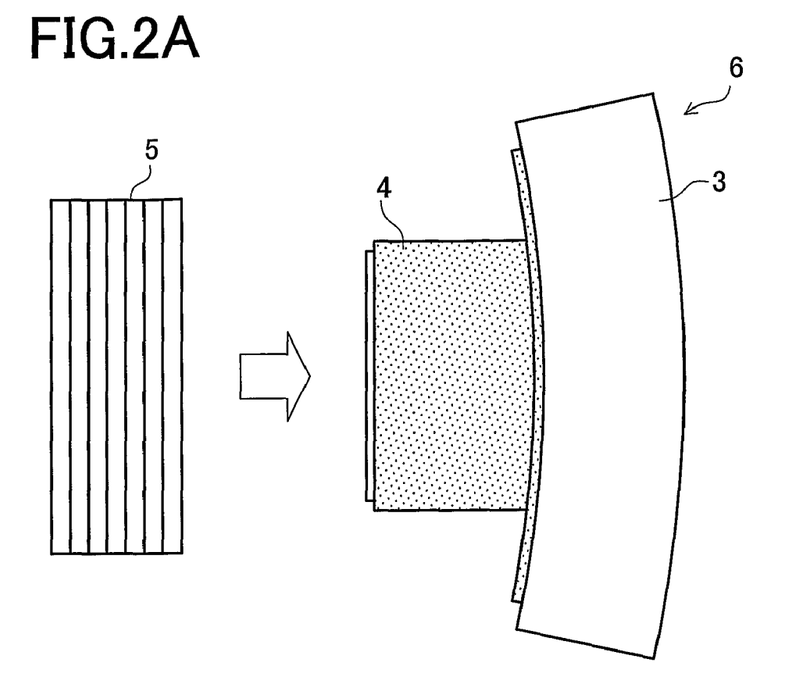
FIGS. 2A and 2B are views of an insulator-molded divided core in the first embodiment.
Figure 2B:
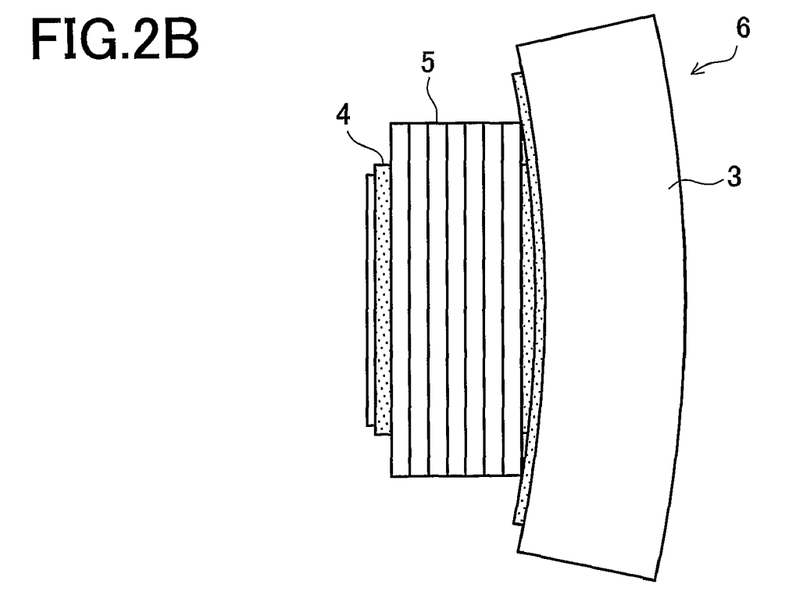

FIGS. 2A and 2B show an insulator-molded divided core 6 which is integrally formed with the molded insulator 4. FIG. 2A is an exploded view of the insulator-molded divided core 6 on which a cassette coil 5 is to be mounted and FIG. 2B shows the divided core 6 assembled with the cassette coil 5. The thickness of the insulator 4 is several hundred microns in the present embodiment, but it is emphatically illustrated to be thick.

As shown in FIG. 2A, an area of the divided core 3 that contacts with the cassette coil 5, that is, a protrusion of the divided core 3 that contacts with a hollow portion of the cassette coil 5 and an inner peripheral surface of the divided core 3 surrounding the protrusion are largely covered with the insulator 4.

As shown in FIG. 2B, the insulator 4 exists all over between the cassette coil 5 and the divided core 3 to enhance insulation of the conductive coil.

Figure 3:
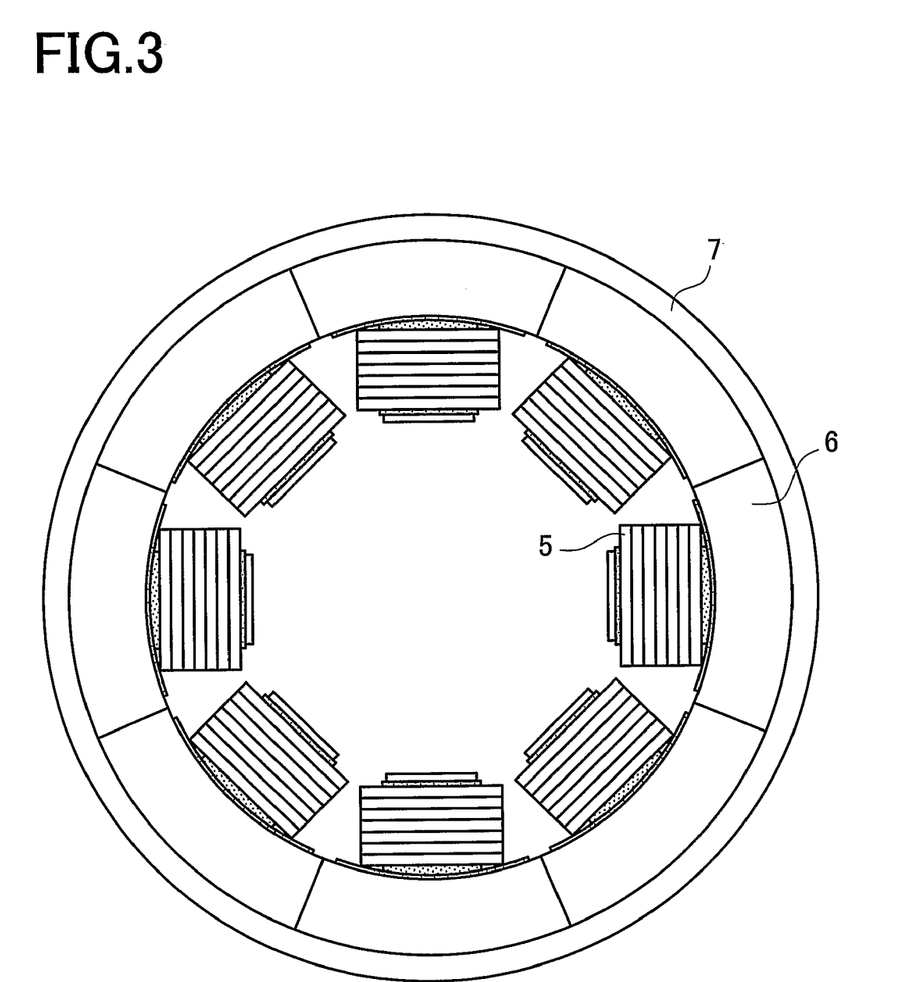
FIG. 3 is a view of an assembled stator in a previous state to molding.
Figure 4:
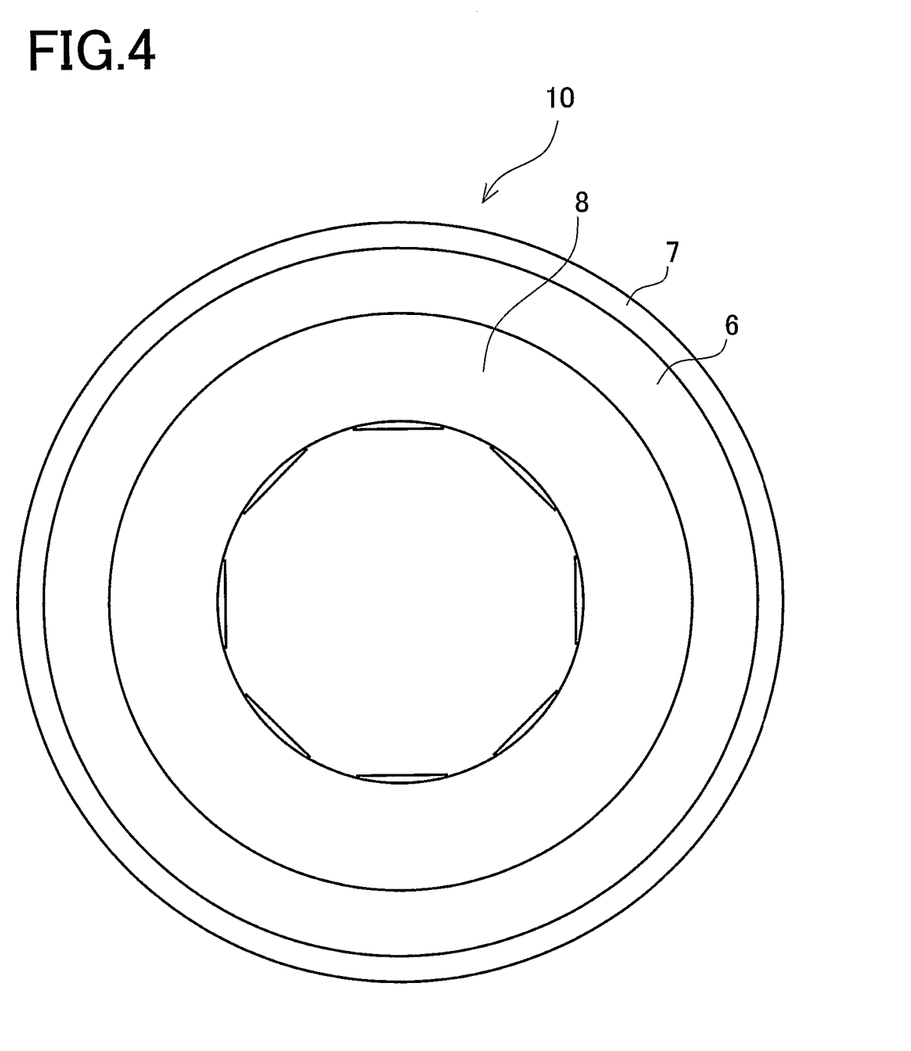
FIG. 4 is a view of the stator after the molding.

FIG. 3 shows eight insulator-molded divided cores 6, on each of which the cassette coil 5 is mounted, are assembled together as a stator assembly with a thermal insert ring 7. Specifically, the ring 7 is heated to expand, the insulator-molded divided cores 6 are set therein, and the ring 7 is cooled to contract. Thus, the eight divided cores 6 are assembled into one piece, forming a stator assembly. This stator assembly is set in a mold and then a thermosetting resin is poured in the mold to form a molded layer 8. A stator 10 shown in FIG. 4 is finally completed.

In the present embodiment, the resin used to form the molded layer 8 is an epoxy thermosetting resin having a linear expansion coefficient equal to that of the resin used to form the insulator 4 by insert molding.

The material of the insulator 4 and the material of the molded layer 8 are the same epoxy thermosetting resin that is regulated so that respective linear expansion coefficients become equal after filling of the filler. The insulator 4 and the molded layer 8 therefore can expand by the same amount as the motor temperature rises, thereby reducing the possibility that the insulator 4 and the molded layer 8 separate or peel off from each other at their boundary surfaces, thus improving crack resistance.

Further, when the heat conductivity of the thermosetting resin used as the material forming the insulator 4 is set to be larger than the heat conductivity of the thermosetting resin used as the material forming the molded layer 8, the insulator 4 can have higher heat radiation capability.

Figure 10:
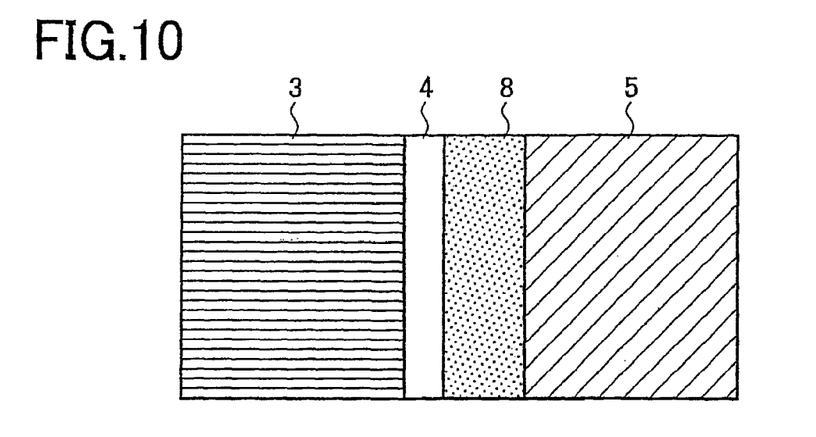
FIG. 10 is a view showing a layer configuration in the first embodiment.

Operations and advantages of the stator 10 of the present embodiment will be described below. FIG. 10 is a sectional view showing a partial configuration of the stator 10 of the first embodiment.

On the surface of the divided core 3 constituted of laminated thin steel plates, the insulator 4 is adhesively formed in close contact relation. In other words, the epoxy thermosetting resin permeates in clearances between the laminated thin plates, thus forming the insulator 4. Since the insulator 4 is adhesively bonded in close contact with the divided core 3, the molded layer 8 is prevented from entering between the insulator 4 and the divided core 3. Thus, four layers; divided core 3, insulator 4, molded layer 8, and cassette coil 5 are formed, with three boundary surfaces. This configuration can reduce the number of boundary surfaces by one as compared with the conventional configuration in FIG. 12.

By the reduction by one in the number of boundary surfaces, it is possible to reduce the occurrence of cracks caused by separation or peeling at the boundary surfaces. Fewer boundary surfaces and close contact of the insulator 4 with the divided core 3 can result in increased heat conduction as compared with the case shown in FIG. 12.

As described above in detail, the stator of the first embodiment is configured such that the thermosetting resin is insert molded on each divided core 3 constituting a stator core to form the insulator 4 integral with each divided core 3 and the stator including the plurality of cassette coils 5 is covered with the thermosetting resin by molding. Accordingly, the number of boundary surfaces can be reduced by one, preventing a decrease in heat conduction due to the boundary surfaces and a decrease in crack resistance. In addition, the epoxy thermosetting resin having an adhesive function can achieve higher heat conduction.

The thermosetting resin used as the material forming the insulator 4 and the thermosetting resin used as the material forming the molded layer 8 are resins having higher heat conduction and hence they are equal in linear expansion coefficient. Accordingly, the insulator 4 and the molded layer 8 can expand and contract together at their boundary surfaces as the motor temperature rises. This makes it possible to prevent separation or peeling of the insulator 4 and the molded layer 8 at their boundary surfaces and thus enhance crack resistance.

When the heat conductivity of the thermosetting resin used as the material forming the insulator 4 is set to be larger than the heat conductivity of the thermosetting resin used as the material forming the molded layer 8, the heat radiation capability of the insulator 4 can be increased. In other words, the divided core 3 and the insulator 4 are integrally bonded to each other in close contact relation, exhibiting high heat conduction. Therefore, the heat generated in the cassette coil 5 can be transferred to the divided core 3 more effectively.

To increase the heat conduction, on the other hand, the heat conductivity of a matrix of the thermosetting resin used to form the insulator 4 and the heat conductivity of the filler have to be increased. However, both measures are high in cost, leading to an increase in total cost of the stator 10. The molded layer 8 is formed thicker at a coil end by a large amount of the material, while the insulator 4 is of a thickness of several hundred microns by a very little amount of the material. Thus, the heat conduction of the insulator 4 can be set to be larger without causing cost increase.

A second embodiment of the present invention will be described below. Similar components to those in the first embodiment are given the same reference numerals.

Figures 5A, 5B:
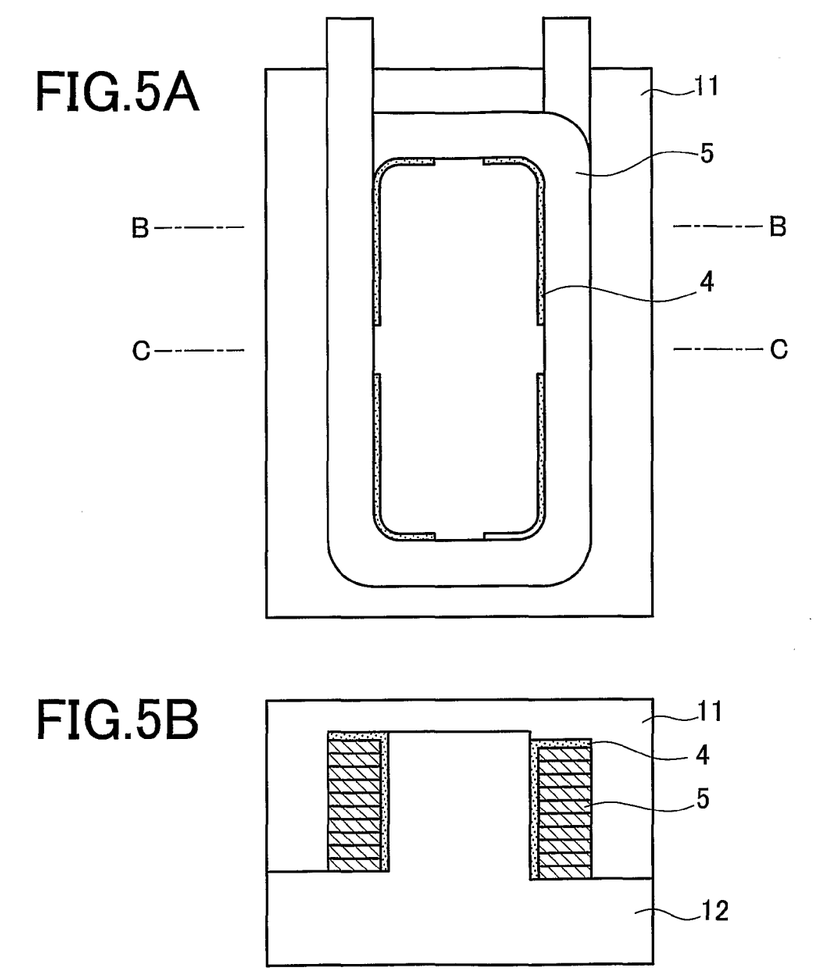
FIGS. 5A to 5C are views of a mold for forming an insulator in a cassette coil by insert molding in a second embodiment.
Figure 5C:
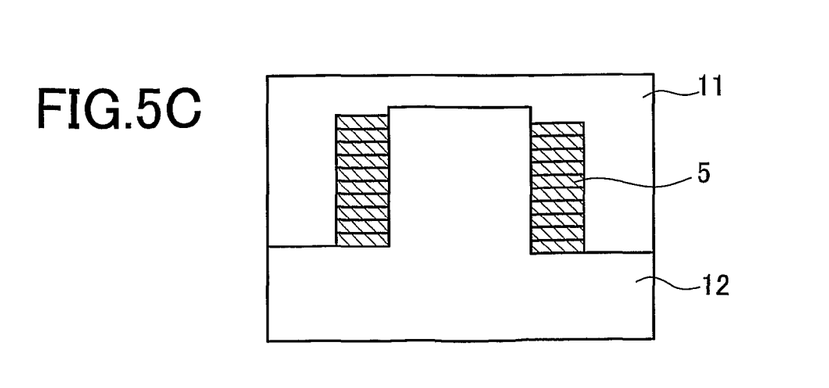

FIG. 5A is a sectional plan view of a mold for forming an insulator 4 on a cassette coil 5 by insert molding. FIG. 5B is a sectional view of the mold taken along a line B-B in FIG. 5A, and FIG. 5C is another sectional view of the mold taken along a line C-C in FIG. 5A. Those figures are sectional views but hatching is omitted for convenience. The mold is constituted of an upper mold 11 and a lower mold 12, which are mated together to form a cavity. This cavity is a space defining the shape of a combination of the cassette coil 5 and the insulator 4 on the inner surface of a winding part (a conductive coil) of the cassette coil 5. In this cavity, the winding part of the cassette coil 5 is set and then for example an epoxy thermosetting resin is injected.

The conductive coil of the cassette coil 5 is a flat coil wound edgewise. The insulator 4 is formed at four inside corners of the cassette coil 5. In other words, the insulator 4 is not formed continuously over the entire inner surface of the cassette coil 5 for the following reason. It is difficult to properly position the cassette coil 5 based on its outer side. To position the cassette coil 5 in place based on its inner side, accordingly, the insulator 4 is divided into four parts between which the position of the cassette coil 5 is specified.

As shown in FIG. 5C, specifically, four faces of the wound conductive coil of the cassette coil 5 taken along the line C-C in FIG. 5A are positioned by the mold. Thus, the space forming the insulator 4 in a position taken along the line B-B in FIG. 5A is determined. When the epoxy thermosetting resin is injected into the space, the insulator 4 is formed adhesively in close contact with the inner surface of the cassette coil 5.

Figure 6A:
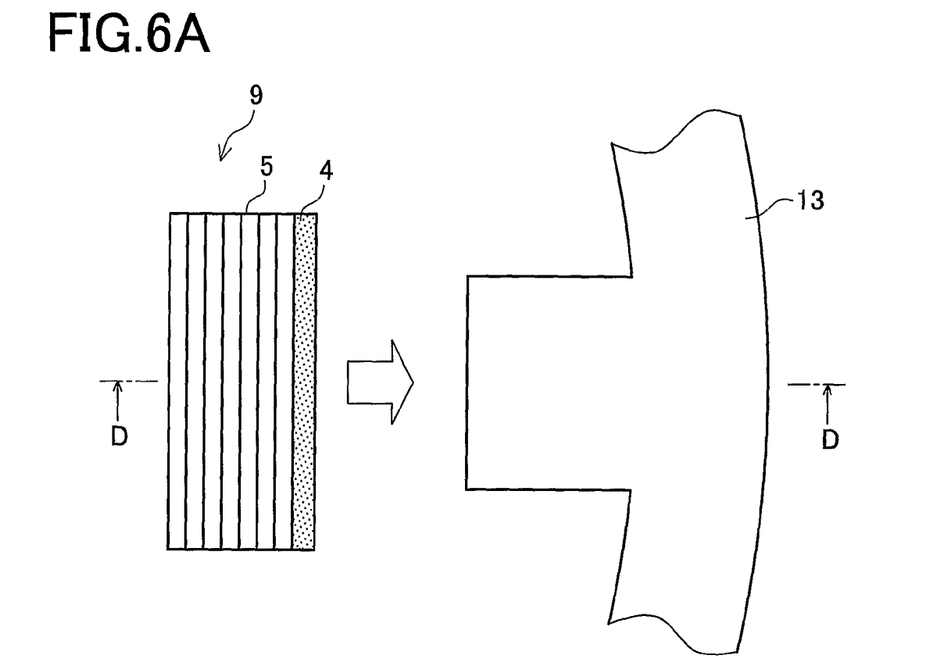
FIGS. 6A and 6B are views of an insulator-molded cassette coil in the second embodiment.
Figure 6B:
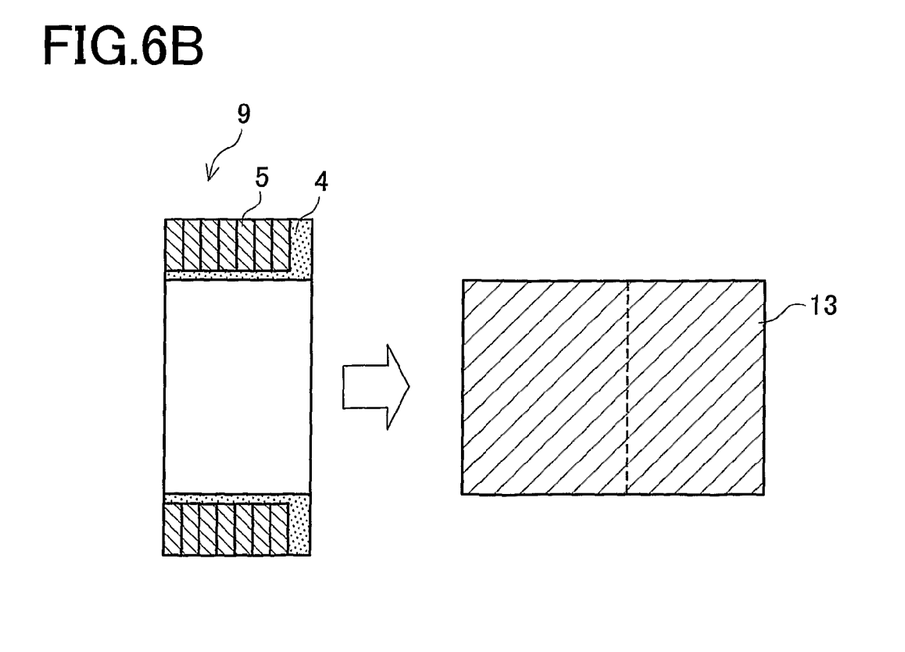

FIGS. 6A and 6B show an insulator-molded cassette coil 9 which is integrally formed with the finished insulator 4. FIG. 6A is a plan view of a stator core 13 prior to assembly and FIG. 6B is a sectional view of the same taken along a line D-D in FIG. 6A.

Figure 7A:
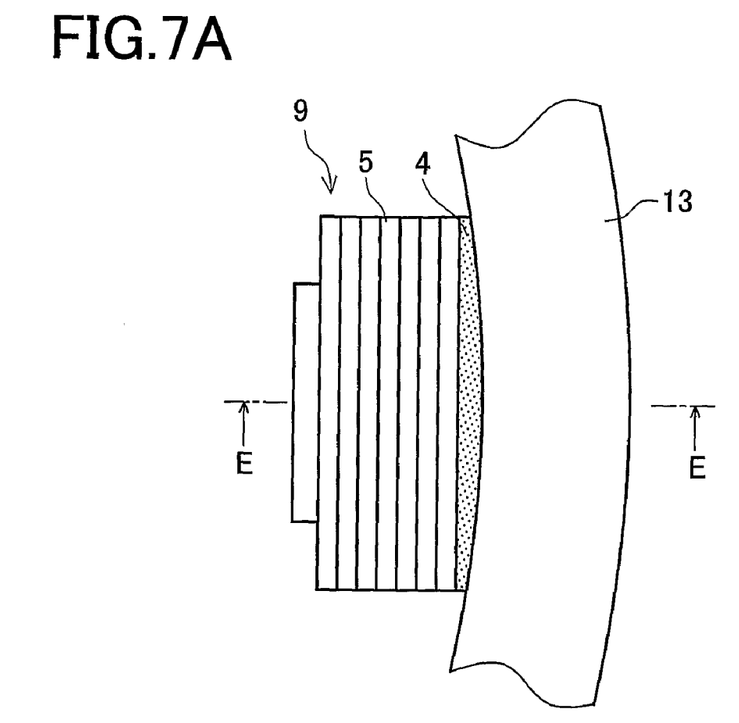
FIGS. 7A and 7B are views showing the insulator-molded cassette coil mounted on the stator core.
Figure 7B:
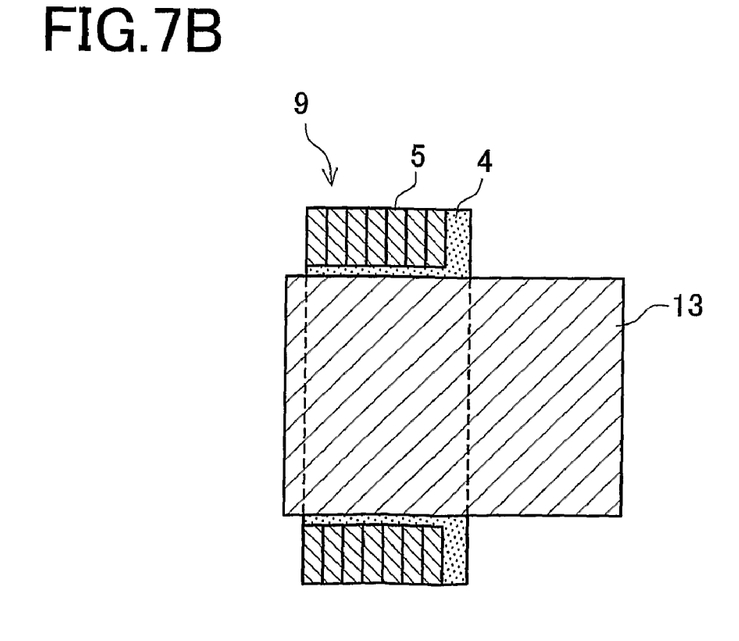

FIGS. 7A and 7B show the insulator-molded cassette coil 9 mounted on a stator core 13; specifically, FIG. 7A is a plan view thereof and FIG. 7B is a sectional view thereof taken along a line E-E in FIG. 7A.

As shown in FIGS. 7A and 7B, an area of the cassette coil 5 that contacts with the stator core 13, that is, the inner surface of the cassette core 5 in which a protrusion of the stator core 13 is inserted and an end face of the cassette coil 5 that contacts with the stator core 13 are largely covered with the insulator 4. In this way, the insulator 4 exists all over between the cassette coil 5 and the stator core 13 to enhance insulation of the conductive coil.

Figure 8:
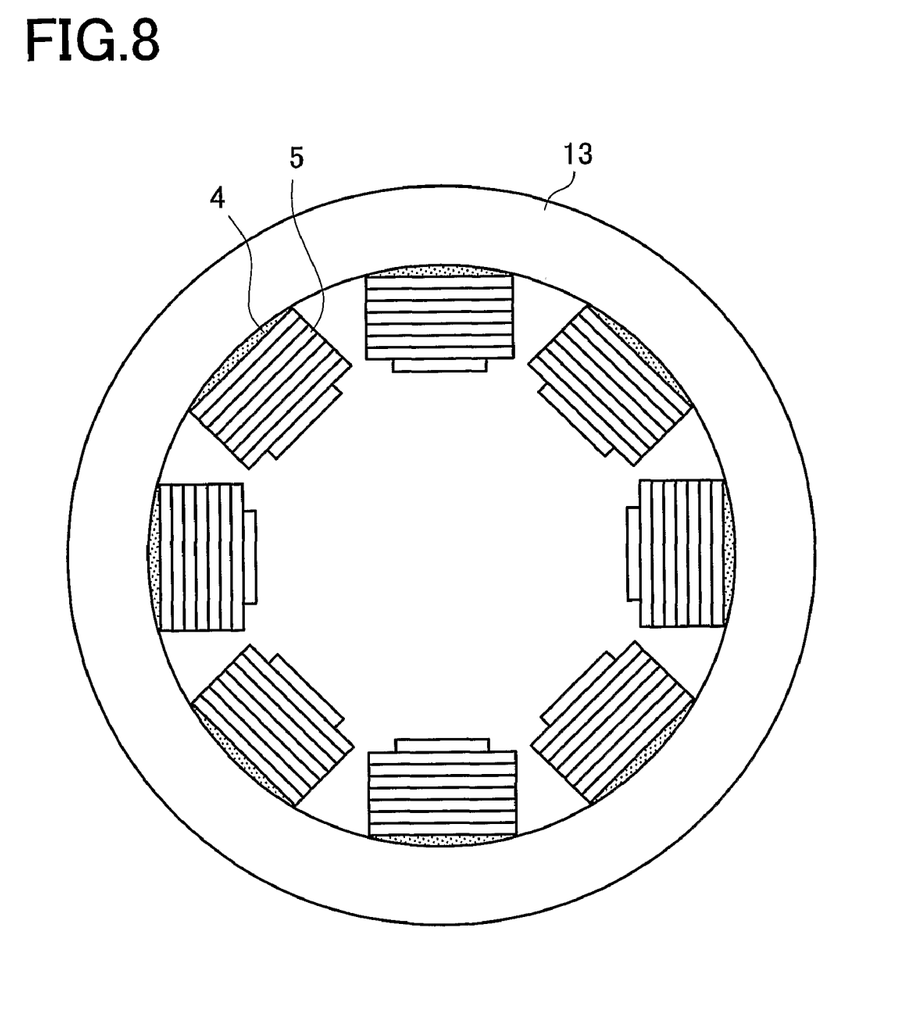
FIG. 8 s a view of an assembled stator in a previous state to molding.
Figure 9:
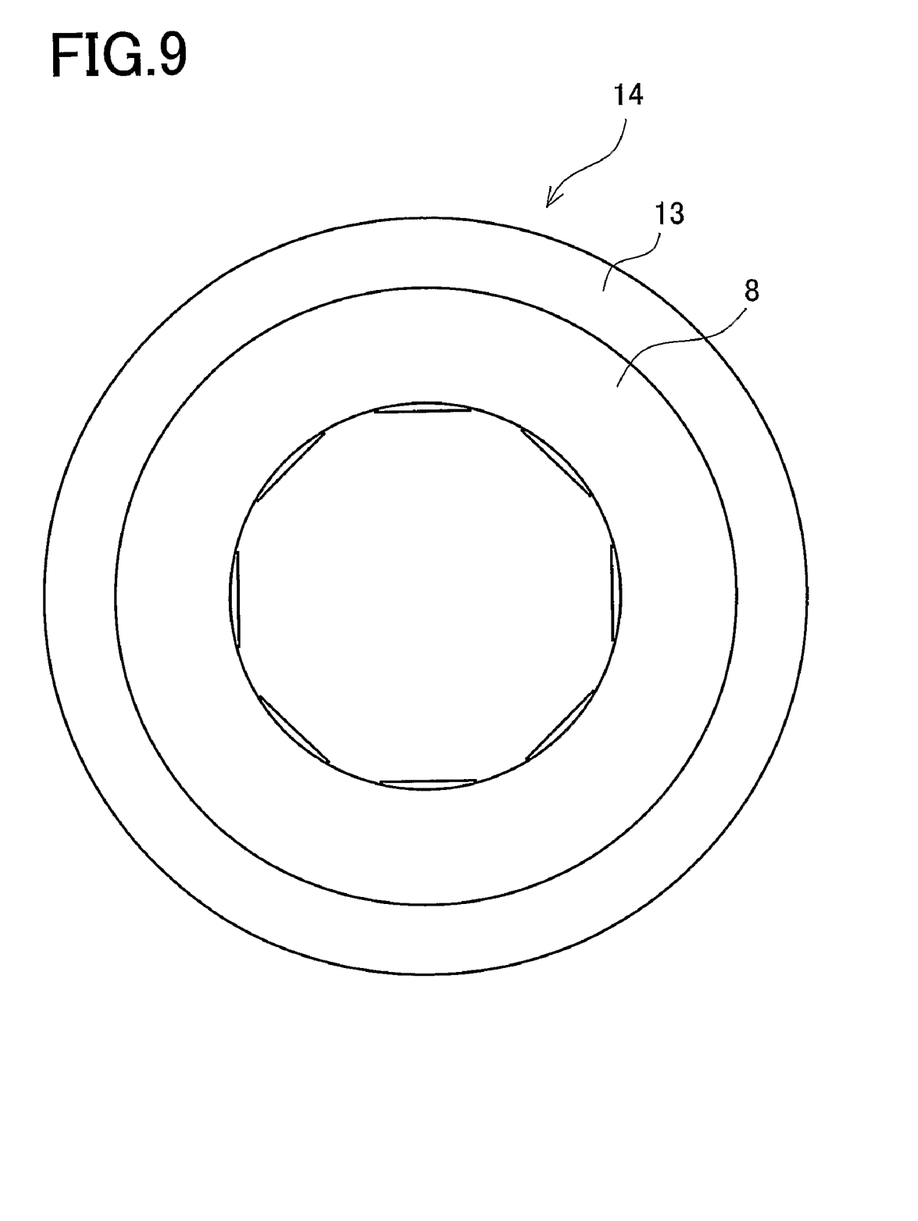
FIG. 9 is a view of the stator after the molding.

FIG. 8 shows eight insulator-molded cassette coils 9 which are individually mounted on the stator cores 13 and assembled together as a stator assembly. This assembly is set in a mold and covered with the thermosetting resin by molding. A stator 14 shown in FIG. 9 is finally completed.

The resin used to form the molded layer 8 is an epoxy thermosetting resin having a linear expansion coefficient equal to that of the resin used to form the insulator 4 in the insert molding.

The material for the insulator 4 and the material for the molded layer are the same epoxy thermosetting resin that is regulated so that respective linear expansion coefficients become equal after filling of the filler. The insulator 4 and the molded layer 8 therefore can expand by the same amount as the motor temperature rises, thereby reducing the possibility that the insulator 4 and the molded layer 8 separate or peel off from each other at their boundary surfaces, thus improving crack resistance.

Further, when the heat conductivity of the thermosetting resin used as a material forming the insulator 4 is set to be larger than the heat conductivity of the thermosetting resin used as a material forming the molded layer 8, the insulator 4 can have higher heat radiation capability. In other words, the cassette coil 5 serving as a heat generator and the insulator 4 are integrally bonded in close contact relation, exhibiting high heat conduction. Thus, the heat generated in the cassette coil 5 can be transferred to the molded layer 8 more efficiently.

Figure 11:
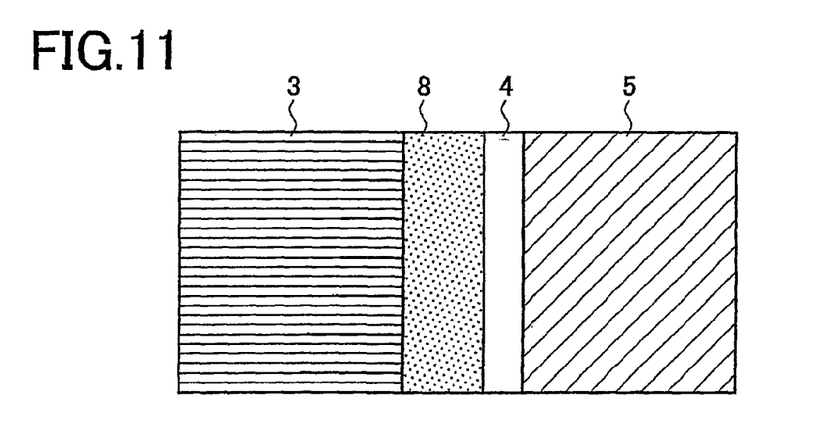
FIG. 11 is a view showing a layer configuration in the second embodiment.

Operations and advantages of the stator 14 of the present embodiment will be described below. FIG. 11 is a sectional view showing a partial configuration of the stator 14 of the present embodiment.

On the surface of the cassette coil 5 constituted of the spirally wound conductive coil, the insulator 4 is adhesively formed in close contact relation. In other words, the epoxy thermosetting resin permeates in clearances between wound coil portions, thus forming the insulator 4. Since the insulator 4 is adhesively bonded in close contact with the cassette coil 5, the molded layer 8 is prevented from entering between the insulator 4 and the cassette coil 5. Thus, four layers; cassette coil 5, insulator 4, molded layer 8, and stator core 13 are formed, with three boundary surfaces. This configuration can reduce the number of boundary surfaces by one as compared with the conventional configuration in FIG. 12.

By the reduction by one in the number of boundary surfaces, it is possible to reduce the occurrence of cracks caused by separation or peeling at the boundary surfaces. Fewer boundary surfaces and close contact of the insulator 4 with the cassette coil 5 can result in increased heat conduction as compared with the case shown in FIG. 12.

As described above in detail, the stator of the second embodiment is configured such that the cassette coil 5 formed of the conductive coil is integrally formed with the insulator 4 molded of the thermosetting resin by insert molding and the stator including the plurality of cassette coils 5 is covered with the thermosetting resin by molding. Accordingly, the number of boundary surfaces can be reduced by one, preventing a decrease in heat conduction due to the boundary surfaces and a decrease in crack resistance. In addition, the epoxy thermosetting resin having an adhesive function can provide higher heat conduction.

The thermosetting resin used as a material forming the insulator 4 and the thermosetting resin used as a material forming the molded layer 8 are resins having higher heat conduction and hence they are equal in linear expansion coefficient. Accordingly, the insulator 4 and the molded layer 8 can expand and contract together at their boundary surfaces as the motor temperature rises. This makes it possible to prevent separation or peeling of the insulator 4 and the molded layer 8 at their boundary surfaces and thus enhance crack resistance.

When the heat conductivity of the thermosetting resin used as the material forming the insulator 4 is set to be larger than the heat conductivity of the thermosetting resin used as the material forming the molded layer 8, the heat radiation capability of the insulator 4 can be increased. In other words, the cassette coil 5 and the insulator 4 are integrally bonded to each other in close contact relation, exhibiting high heat conduction. Thus, the heat generated in the cassette coil 5 can be transferred to the divided core 3 more effectively.

To increase the heat conduction, on the other hand, the heat conductivity of a matrix and the heat conductivity of the filler have to be increased. However, both measures are high in cost, leading to an increase in total cost of the stator 14. The molded layer 8 is formed thicker at a coil end by a large amount of the material, while the insulator 4 is of a thickness of several hundred microns by a very little amount of the material. Thus, the heat conduction of the insulator 4 can be set to be larger without causing cost increase.

The present invention may be embodied in other specific forms without departing from the essential characteristics thereof.

For instance, the above embodiments use the thermal insert ring 7 to assemble the divided cores 3 together. As an alternative, the divided cores 3 may be assembled together with a mechanical tightening manner using a bolt or the like.

The invention claimed is:

1. A motor stator including a plurality of stator coils, wherein each of said plurality of stator coils is formed of a conductive coil wound on a divided stator core, wherein the divided stator core is integrally formed with an insulator made of a thermosetting resin by insert molding, the stator including the plurality of stator coils is covered with a molded layer made of a thermosetting resin by molding, and boundary surfaces between each divided stator core and each stator coil include only a boundary surface between the divided stator core and the insulator, a boundary surface between the insulator and the molded layer, and a boundary surface between the molded layer and the stator coil.

2. The motor stator according to claim 1, wherein
the thermosetting resin forming the insulator and the thermosetting resin forming the molded layer are equal in linear expansion coefficient.

3. The motor stator of claim 1, wherein the molded layer is made of a thermosetting resin filled with high-heat conductivity fillers.

4. The motor stator according to claim 1, wherein
the thermosetting resin forming the insulator is larger in heat conductivity than the thermosetting resin forming the molded layer.

5. The motor stator according to claim 1, wherein
the conductive coil is a coil that has a flat shape in section and is wound edgewise, and the insulator is partly formed at four corners of one of the stator core and the conductive coil.

6. A motor stator including a plurality of stator coils wherein each of said plurality of stator coils is formed of a conductive coil wound on a divided stator core, wherein the conductive coil is integrally formed with an insulator made of a thermosetting resin by insert molding, the stator including the plurality of stator coils is covered with a molded layer made of a thermosetting resin by molding, and boundary surfaces between each divided stator core and each stator coil include only a boundary surface between the divided stator core and the molded layer, a boundary surface between the molded layer and the insulator, and a boundary surface between the insulator and the stator coil.

7. The motor stator according to claim 6, wherein
the thermosetting resin forming the insulator and the thermosetting resin forming the molded layer are equal in linear expansion coefficient.

8. The motor stator according to claim 7, wherein
the resins equal in linear expansion coefficient are in epoxy thermosetting resin containing 60 to 80 vol % of filler, and the linear expansion coefficient is 10 to 20 ppm/° C.

9. The motor stator according to claim 7, wherein
the thermosetting resin forming the insulator is larger in heat conductivity than the thermosetting resin forming the molded layer.

10. The motor stator according to claim 6, wherein
the conductive coil is a coil that has a flat shape in section and is wound edgewise, and the insulator is partly formed at four corners of one of the stator core and the conductive coil.

11. The motor stator according to claim 3, wherein
the resins equal in linear expansion coefficient are an epoxy thermosetting resin containing 60 to 80 vol % of filler, and the linear expansion coefficient is 10 to 20 ppm/° C.

12. The motor stator of claim 6, wherein the molded layer is made of a thermosetting resin filled with high-heat conductivity fillers.

\* \* \* \* \*

UNITED STATES PATENT AND TRADEMARK OFFICE
CERTIFICATE OF CORRECTION

PATENT NO. : 8,063,518 B2
APPLICATION NO. : 12/513766
DATED : November 22, 2011
INVENTOR(S) : Masataka Asai Page 1 of 1

It is certified that error appears in the above-identified patent and that said Letters Patent is hereby corrected as shown below:

| Column | Line | |
|--------|------|---|
| 10 | 16 | Change "claim 7" to --claim 6--. |

Signed and Sealed this
Twentieth Day of November, 2012

David J. Kappos
*Director of the United States Patent and Trademark Office*